US012107482B2

(12) United States Patent
Wu et al.

(10) Patent No.: US 12,107,482 B2
(45) Date of Patent: Oct. 1, 2024

(54) VOICE COIL MOTOR ASSEMBLY (71) Applicant: Lanto Electronic Limited, Kunshan (CN)

(72) Inventors: Fu-Yuan Wu, Taipei (TW); Yu-Cheng Lin, Taipei (TW); Shang-Yu Hsu, Taipei (TW); Tao-Chun Chen, Taipei (TW)

(73) Assignee: LANTO ELECTRONIC LIMITED, Kunshan (CN)

( * ) Notice: Subject to any disclaimer, the term of this patent is extended or adjusted under 35 U.S.C. 154(b) by 241 days.

(21) Appl. No.: 17/824,522

(22) Filed: May 25, 2022

(65) Prior Publication Data

US 2022/0385136 A1 Dec. 1, 2022

(30) Foreign Application Priority Data

Jun. 1, 2021 (CN) .......................... 202121212250.3

(51) Int. Cl.
*H02K 5/24* (2006.01)
*G03B 13/34* (2021.01)
*H02K 41/035* (2006.01)
(52) U.S. Cl.
CPC ............... *H02K 5/24* (2013.01); *G03B 13/34* (2013.01); *H02K 41/0354* (2013.01)

(58) Field of Classification Search
CPC ......... H02K 41/0354; G02B 7/04; G02B 7/09
See application file for complete search history.

(56) References Cited

U.S. PATENT DOCUMENTS

2019/0391362 A1\* 12/2019 Wu .......................... G02B 7/08
2020/0366157 A1\* 11/2020 Liu .......................... H02K 5/24

\* cited by examiner

*Primary Examiner* — Bryan R Perez
(74) *Attorney, Agent, or Firm* — Birch, Stewart, Kolasch & Birch, LLP (57) ABSTRACT

A voice coil motor assembly including a base, a frame, an elastic sheet, a housing, and a plurality of shock-absorbing components is provided. The frame is disposed on the base. The frame includes a bottom surface, a top surface, a plurality of side walls and a support frame. One side of the elastic sheet is disposed on the top surface of the frame and the other is disposed on the support frame. The housing is disposed above the base to receive the frame and the elastic sheet. The housing includes a housing top wall and a plurality of housing side walls surrounding the housing top wall. The shock-absorbing components are disposed on the frame and are sandwiched between the frame and the housing side walls of the housing, and/or between the support frame and the housing top wall of the housing.

16 Claims, 7 Drawing Sheets

VOICE COIL MOTOR ASSEMBLY

CROSS REFERENCE TO RELATED APPLICATION

This application claims the priority benefit of Chinese Patent Application Serial Number 202121212250.3, filed on Jun. 1, 2021, the full disclosure of which is incorporated herein by reference.

BACKGROUND

Technical Field

The present disclosure relates to the technical field of a motor assembly, particularly to a voice coil motor assembly.

Related Art

Due to the advances in semiconductor manufacturing processes, various processing chips have been reduced in size while still having considerable computing performance, thereby driving people's requirements for lightness and thinness of portable mobile devices. However, after the portable mobile devices are reduced in size and weight, the subsequent problem to be faced is whether it can withstand an external impact.

For example, the portable mobile devices such as cell phones, tablets, laptops, etc. may be accidentally impacted by external forces or accidentally dropped to the ground when they are carried and used. Therefore, rigid design of a frame of the portable mobile device and shock absorption and cushioning design between internal components have become extremely important.

Among the internal components of the portable mobile devices, a voice coil motor in a camera module has stricter requirements for shock absorption. In detail, since the voice coil motor in the camera module is used to control focus of a camera lens, it has considerable requirements for accuracy. Once it is hit or encountered violent vibration, it may cause the camera module to be damaged and unable to focus.

The voice coil motor of current camera modules only uses a boss design on its frame. When an impact or violent vibration occurs, generated force is concentrated on the boss, thereby reducing damage to the voice coil motor. However, since the frame of the voice coil motor is made of plastic, it is a hard-to-hard situation when the frame collides with surrounding components. Therefore, if impact force or vibration is too strong, it may still cause serious damage to a body of the voice coil motor.

In view of this, how to provide a voice coil motor assembly that can effectively absorb an external impact or violent vibration, thereby avoiding the damage to the voice coil motor or the generation of noise, is the problem that needs to be solved urgently in the industry.

SUMMARY

The embodiments of the present disclosure provide a voice coil motor assembly to solve the problem that when a current camera module uses a boss structure and is subjected to collision or violent vibration, a body of the voice coil motor will still be seriously damaged due to hard collision with surrounding components.

Embodiments of the present disclosure provide a voice coil motor assembly, which comprises:
a base; and
a frame disposed on the base, wherein the frame comprises a bottom surface, a top surface opposite to the bottom surface, a plurality of side walls surrounding the bottom surface and the top surface, and a support frame located between the plurality of side walls;
an elastic sheet, wherein one side of the elastic sheet is disposed on the top surface of the frame and the other side of the elastic sheet is disposed on the support frame;
a housing disposed above the base to receive the frame and the elastic sheet, wherein the housing comprises a housing top wall and a plurality of housing side walls surrounding the housing top wall; and
a plurality of shock-absorbing components disposed on the frame, wherein the plurality of shock-absorbing components are sandwiched between the frame and the plurality of housing side walls of the housing, and/or between the support frame and the housing top wall of the housing.

In another embodiment of the disclosure, one side of the plurality of side walls of the frame facing the adjacent plurality of housing side walls comprises a plurality of first receiving grooves, the plurality of shock-absorbing components comprise a plurality of first shock-absorbing components, the plurality of first receiving grooves receive the plurality of first shock-absorbing components, and the plurality of first shock-absorbing components are sandwiched between the plurality of side walls of the frame and the plurality of housing side walls of the housing.

In another embodiment of the disclosure, the plurality of side walls of the frame are protruded with a plurality of first convex rings toward a side of the adjacent plurality of housing side walls, the plurality of first convex rings respectively form the plurality of first receiving grooves, a portion of the plurality of first shock-absorbing components is located in the plurality of first receiving grooves, and another portion of the plurality of first shock-absorbing components is located outside the plurality of first receiving grooves and covers the plurality of first convex rings.

In another embodiment of the disclosure, each of the plurality of first convex rings is an oblong ring, and each of the plurality of first receiving grooves is an oblong groove.

In another embodiment of the disclosure, the plurality of first shock-absorbing components are sandwiched in groups of two between each of the side walls and each of the housing side walls.

In another embodiment of the disclosure, the support frame comprises a plurality of second receiving grooves on a side facing the housing top wall of the housing, the plurality of shock-absorbing components comprise a plurality of second shock-absorbing components, the plurality of second receiving grooves receive the plurality of second shock-absorbing components, and the plurality of second shock-absorbing components are sandwiched between the support frame and the housing top wall of the housing.

In another embodiment of the disclosure, a plurality of second convex rings are protruded from a side of the support frame facing the housing top wall of the housing, the plurality of second convex rings respectively form the plurality of second receiving grooves, a portion of the plurality of second shock-absorbing components is located in the plurality of second receiving grooves, another portion of the plurality of second shock-absorbing components is located outside the plurality of second receiving grooves and covers the plurality of second convex rings.

In another embodiment of the disclosure, each of the plurality of second convex rings is a circular ring, and each of the plurality of second receiving grooves is a circular groove.

In another embodiment of the disclosure, a material of the plurality of shock-absorbing components is silica gel, rubber, or thermoplastic elastomer.

In the voice coil motor assembly of present disclosure, a side of the support frame facing the housing top wall of the housing comprises a plurality of third receiving grooves corresponding to the elastic sheet, the plurality of third receiving grooves receive a plurality of third shock-absorbing components, and a portion of the elastic sheet is fixed in the plurality of third shock-absorbing components.

In another embodiment of the disclosure, the elastic sheet is suspended above the top surface of the frame via a plurality of suspension wires, the plurality of suspension wires extend upward from the base and are surrounding an outside of the frame, the plurality of suspension wires are fixed to the base by a plurality of fourth shock-absorbing components, and the plurality of fourth shock-absorbing components extend downward to a side edge of the base.

In another embodiment of the disclosure, through arrangements of the plurality of first shock-absorbing components, the plurality of second shock-absorbing components, the plurality of third shock-absorbing components, and the plurality of fourth shock-absorbing components, a structure of the voice coil motor can effectively absorb impact force or violent vibration from an outside, so as to avoid the damage to the voice coil motor or the generation of noise.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The accompanying drawings illustrated herein are used to provide a further understanding of the present disclosure and form part of the present disclosure. The exemplary embodiments of the present disclosure and the description thereof are used to explain the present disclosure and do not constitute an undue limitation of the present disclosure.

DETAILED DESCRIPTION OF THE EMBODIMENTS

The technical solution in the embodiments of the present disclosure will be clearly and completely described below with reference to the accompanying drawings in the embodiments of the present disclosure. It is to be understood that the described embodiments are merely exemplary of the invention, and not restrictive of the full scope of the invention. All other embodiments, which can be obtained by a person skilled in the art without inventive step based on the embodiments of the present disclosure, are within the scope of the present disclosure.

Figure 1:
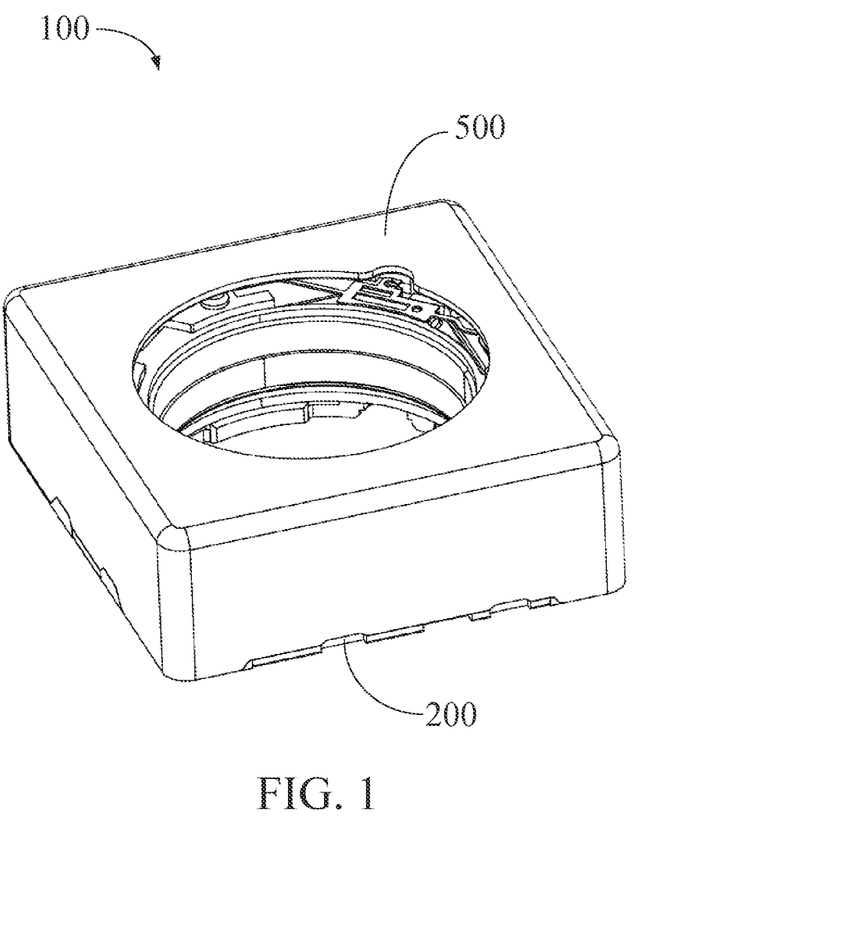
FIG. 1 is a perspective view of a voice coil motor assembly of the present disclosure.
Figure 3:
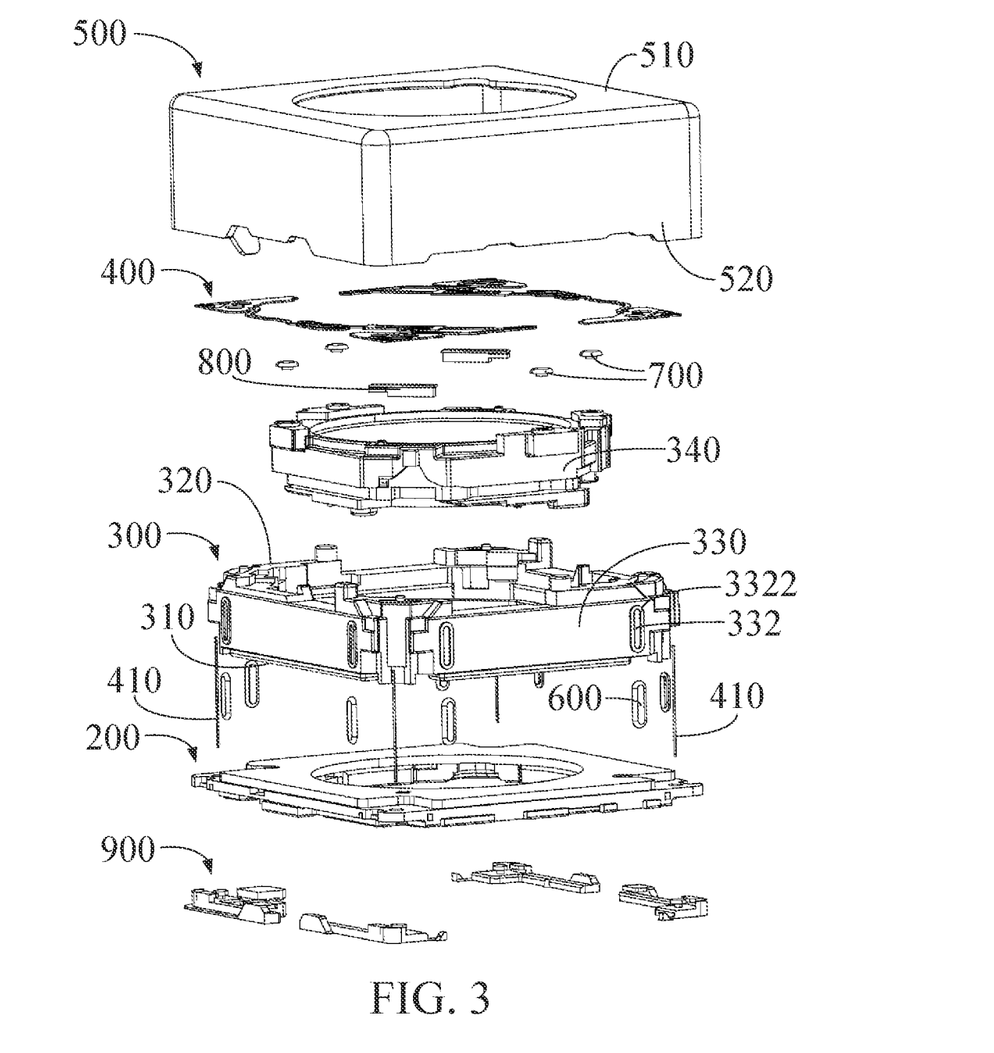
FIG. 3 is an exploded view of the voice coil motor assembly of the present disclosure.

Please refer to FIG. 1 and FIG. 3 together. The present disclosure provides a voice coil motor assembly 100, which comprises a base 200, a frame 300, an elastic sheet 400, a housing 500, and a plurality of shock-absorbing components.

Figure 2:
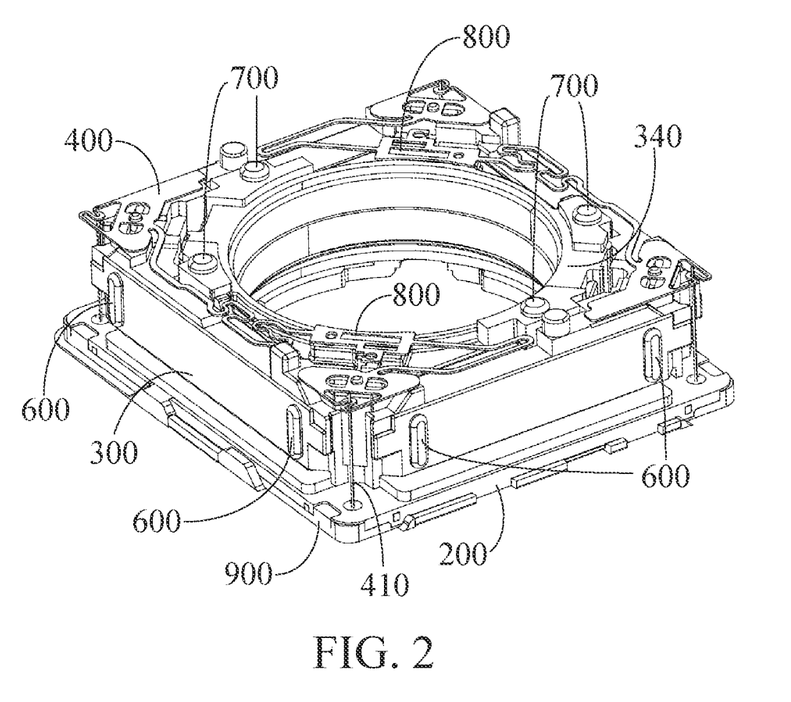
FIG. 2 is a schematic view of the voice coil motor assembly of the present disclosure without a housing.

In detail, please refer to FIG. 2 together. The frame 300 is disposed on the base 200. The frame 300 comprises a bottom surface 310, a top surface 320 disposed opposite to the bottom surface 310, a plurality of side walls 330 surrounding the bottom surface 310 and the top surface 320, and a support frame 340 located between the plurality of side walls 330. One side of the elastic sheet 400 is disposed on the top surface 320 of the frame 300 and the other side is disposed on the support frame 340. The housing 500 is disposed above the base 200 to receive the frame 300 and the elastic sheet 400, and the housing 500 has a housing top wall 510 and a plurality of housing side walls 520 surrounding the housing top wall 510. The plurality of shock-absorbing components are disposed on the frame 300, and the plurality of shock-absorbing components are sandwiched between the frame 300 and the plurality of housing side walls 520 of the housing 500, and/or between the support frame 340 and the housing top wall 510 of the housing 500.

In this way, when the voice coil motor assembly 100 of the present disclosure is subjected to an external impact or violent vibration, the plurality of shock-absorbing components sandwiched between the frame body 300 and the plurality of housing side walls 520 of the housing 500 and; or between the support frame 340 and the housing top wall 510 of the housing 500 can play a role of shock-absorbing and buffering. The impact or vibration transmitted from lateral directions and an upper side to the housing 500 is absorbed by the plurality of shock-absorbing components, so as to avoid affecting the frame 300 disposed inside. Please refer to FIG. 3 and FIG. 4, a side of the plurality of side walls 330 of the frame 300 facing the adjacent plurality of housing side walls 520 comprises a plurality of first receiving grooves 332. The plurality of shock-absorbing components comprises a plurality of first shock-absorbing components 600. The plurality of first receiving grooves 332 receive the plurality of first shock-absorbing components 600, and the plurality of first shock-absorbing components 600 are sandwiched between the plurality of side walls 330 of the frame 300 and the plurality of housing side walls 520 of the housing 500.

Figure 4:
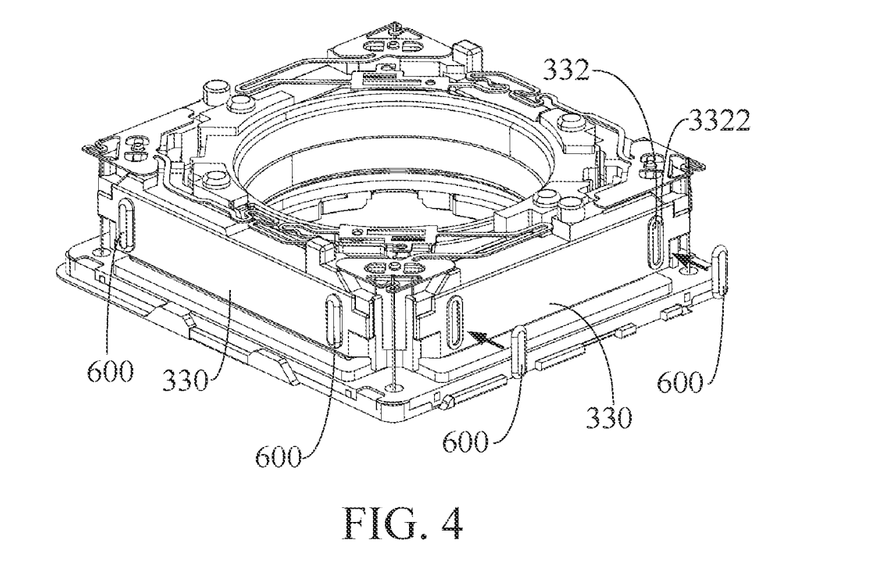
FIG. 4 is a schematic view of an arrangement of first shock-absorbing components of the voice coil motor assembly of the present disclosure.

In detail, the plurality of side walls 330 of the frame 300 are protruded with a plurality of first convex rings 3322 toward a side of the adjacent plurality of housing side walls 520. The plurality of first convex rings 3322 respectively form the plurality of first receiving grooves 332. A portion of the plurality of first shock-absorbing components 600 is located in the plurality of first receiving grooves 332, and another portion of the plurality of first shock-absorbing components 600 is located outside the plurality of first receiving grooves 332 and covers the plurality of first convex rings 3322.

In the embodiment, each of the plurality of first convex rings 3322 is an oblong ring, and each of the plurality of first receiving grooves 332 is an oblong groove. The plurality of first shock-absorbing components 600 are sandwiched in groups of two between each of the side walls 330 and each of the housing side walls 520. However, this is not a limitation.

Through the above arrangement, when the voice coil motor assembly 100 of the present disclosure is subjected to the external impact or violent vibration, the plurality of first shock-absorbing components 600 sandwiched between the plurality of side walls 330 of the frame 300 and the plurality of housing side walls 520 of the housing 500 can play the role of shock-absorbing and buffering. The impact or vibration transmitted from the side direction and the upper side to the housing 500 is absorbed by the plurality of shock-absorbing components, so as to avoid affecting the frame 300 disposed inside.

Figure 5:
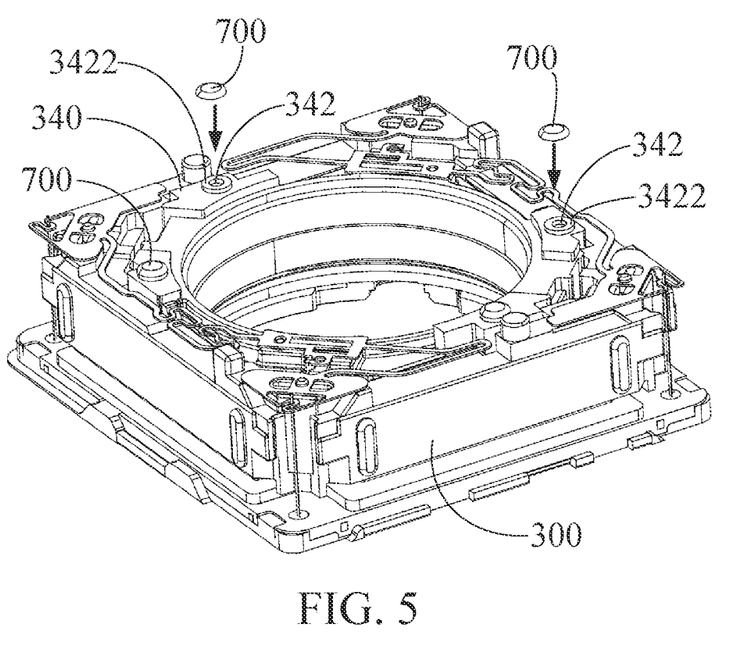
FIG. 5 is a schematic view of an arrangement of second shock-absorbing components of the voice coil motor assembly of the present disclosure.

Please refer to FIG. 5, the support frame 340 of the voice coil motor assembly 100 of the present disclosure comprises a plurality of second receiving grooves 342 on a side facing the housing top wall 510. The plurality of shock-absorbing components comprises a plurality of second shock-absorbing components 700. The plurality of second receiving grooves 342 receive the plurality of second shock-absorbing components 700, and the plurality of second shock-absorbing components 700 are sandwiched between the support frame 340 and the housing top wall 510 of the housing 500.

In detail, a plurality of second convex rings 3422 are protruded from a side of the support frame 340 facing the housing top wall 510. The plurality of second convex rings 3422 respectively form the plurality of second receiving grooves 342. A portion of the plurality of second shock-absorbing components 700 is located in the plurality of second receiving grooves 342, and another portion of the plurality of second shock-absorbing components 700 is located outside the plurality of second receiving grooves 342 and covers the plurality of second convex rings 3422.

In the embodiment, each of the plurality of second convex rings 3422 is a circular ring, and each of the plurality of second receiving grooves 342 is a circular groove. However, this is not a limitation.

In this way, when the housing 500 is disposed above the base 200 to receive the frame 300, the plurality of second shock-absorbing components 700 are sandwiched between the support frame 340 and the housing top wall 510 of the housing 500. Therefore, when the voice coil motor assembly 100 of the present disclosure is subjected to the external impact or violent vibration, the plurality of second shock-absorbing assemblies 700 sandwiched between the support frame 340 and the housing top wall 510 of the housing 500 can serve as a shock-absorbing buffer, so that the impact or vibration transmitted from above to the housing 500 is absorbed by the plurality of second shock-absorbing components 700, so as to avoid affecting the support frame 340 disposed inside.

In some embodiments, the plurality of side walls 330 of the frame 300 and the support frame 340 are respectively provided with magnetic components (such as coils, magnets, magnetic conductive element, etc.) corresponding to each other. When the magnetic components generate magnetic force with each other, the support frame 340 can reciprocate relative to the side wall 330. For example, the support frame 340 comprises a hollow ring shape, and a hollow portion of the hollow ring shape is provided with a lens assembly. The support frame 340 can drive the lens assembly to move back and forth along its optical axis. The elastic sheet 400 helps the reciprocating movement of the support frame 340 and can maintain stability during the movement of the support frame 340.

It should be noted that, in a preferred embodiment, materials of the plurality of first shock-absorbing components 600 and the plurality of second shock-absorbing components 700 are silicone, rubber, or thermoplastic elastomer, and the voice coil motor assembly 100 of the present disclosure comprises a rectangular structure. Therefore, the plurality of side walls 330 of the frame 300 are four side walls 330, the plurality of housing side walls 520 of the housing 500 are four housing side walls 520, and the plurality of suspension wires 410 are four suspension wires 410. However, this is not a limitation.

Corresponding to the above-mentioned rectangular structure, the plurality of first shock-absorbing components 600 may be eight first shock-absorbing components 600, and the plurality of second shock-absorbing components 700 may be four second shock-absorbing components 700. As shown in FIG. 4, eight first shock-absorbing components 600 are sandwiched in groups of two between each side wall 330 and each housing side wall 520, so as to absorb lateral impact or violent vibration from in a more effective way.

Figure 6:
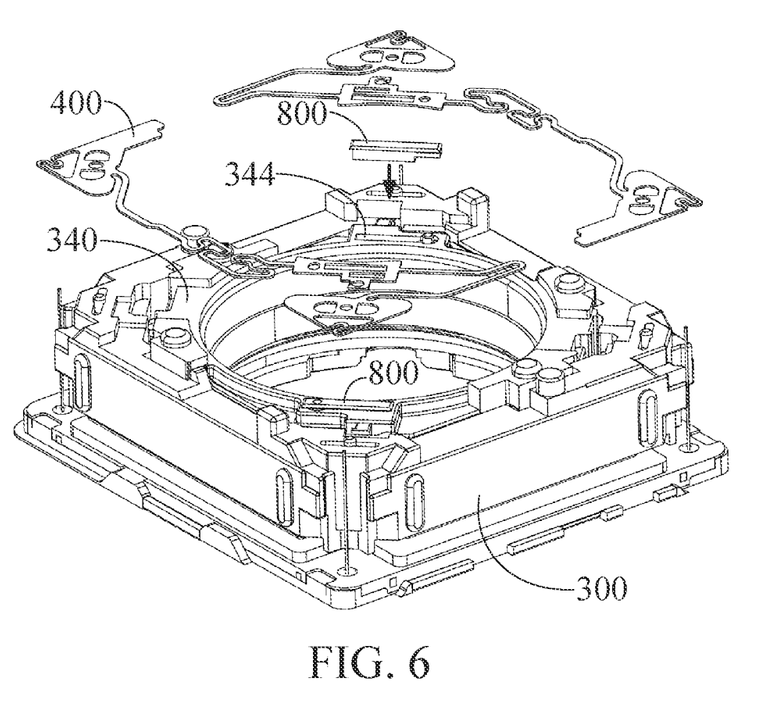
FIG. 6 is a schematic view of an arrangement of third shock-absorbing components of the voice coil motor assembly of the present disclosure.

As shown in FIG. 6, a side of the support frame 340 facing the housing top wall 510 corresponding to the elastic sheet 400 comprises a plurality of third receiving grooves 344, and the plurality of third receiving grooves 344 receive a plurality of third shock-absorbing components 800. A portion of the elastic sheet 400 is fixed in the plurality of third shock-absorbing components 800. In detail, the plurality of third shock-absorbing components 800 are sandwiched between the support frame 340 and the elastic sheet 400, which can be used to assist in absorbing the impact or violent vibration from above.

Figure 7:
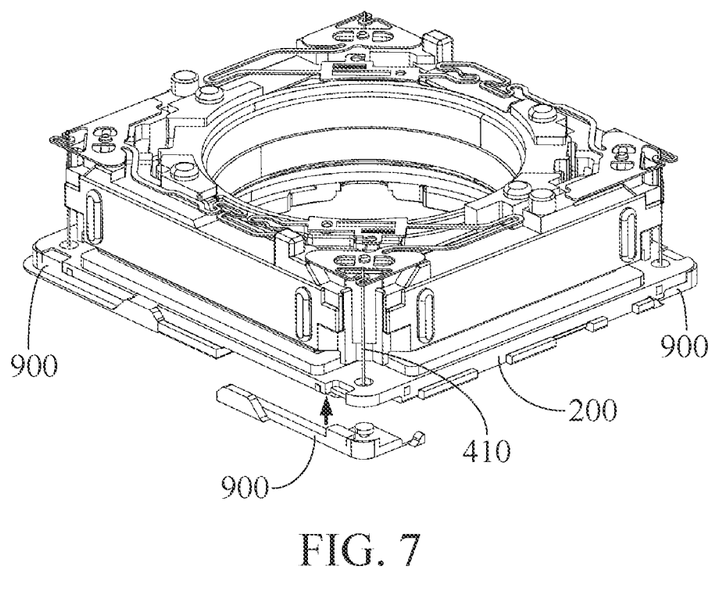
FIG. 7 is a schematic view of an arrangement of fourth shock-absorbing components of the voice coil motor assembly of the present disclosure.

Please refer to FIG. 7, the elastic sheet 400 of the voice coil motor assembly 100 of the present disclosure is suspended above the top surface 320 of the frame 300 via a plurality of suspension wires 410, The plurality of suspension wires 410 extend upward from the base 200 and are surrounding an outside of the frame 300. The plurality of suspension wires 410 are fixed to the base 200 by a plurality of fourth shock-absorbing components 900, and the plurality of fourth shock-absorbing components 900 extend downward to a side edge of the base 200. In this way, when the voice coil motor assembly 100 of the present disclosure is installed on a circuit board or other components in a portable mobile device, the fourth shock-absorbing components 900 can absorb the impact or violent vibration from a lower side, so as to avoid affecting the components disposed inside, such as the frame 300 and the support frame 340.

It should be noted that, in a preferred embodiment, materials of the plurality of third shock-absorbing components 800 and the plurality of fourth shock-absorbing components 900 are silicone, rubber, or thermoplastic elastomer. However, this is not a limitation.

In summary, in the embodiments of the present disclosure, when the voice coil motor assembly 100 is subjected to the external impact or violent vibration, etc., an effect of shock absorption or buffering of the impact or violent vibration from the lateral directions can be achieved through the arrangement of the plurality of first shock-absorbing components 600, an effect of shock absorption or buffering of the impact or violent vibration from the upper side can be achieved through the arrangement of plurality of second shock-absorbing components 700 and the plurality of third shock-absorbing components 800, and an effect of shock absorption or buffering of the impact or violent vibration from the lower side can be achieved through the arrangement of plurality of fourth shock-absorbing components 900. Therefore, the voice coil motor assembly 100 of the present disclosure can effectively absorb the impact force or violent vibration from the upper side, the lower side, and the lateral directions, thereby reliably and effectively avoiding the damage to the components disposed inside or the generation of noise.

It is to be understood that the term "comprises", "comprising", or any other variants thereof, is intended to encompass a non-exclusive inclusion, such that a process, method, article, or device of a series of elements not only include those elements hut also comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A voice coil motor assembly, comprising:
   a base; and
   a frame disposed on the base, wherein the frame comprises a bottom surface, a top surface opposite to the bottom surface, a plurality of side walls surrounding the bottom surface and the top surface, and a support frame located between the plurality of side walls;
   an elastic sheet, wherein one side of the elastic sheet is disposed on the top surface of the frame and the other side of the elastic sheet is disposed on the support frame;
   a housing disposed above the base to receive the frame and the elastic sheet, wherein the housing comprises a housing top wall and a plurality of housing side walls surrounding the housing top wall; and
   a plurality of shock-absorbing components disposed on the frame, wherein the plurality of shock-absorbing components are sandwiched between the frame and the plurality of housing side walls of the housing and/or between the support frame and the housing top wall of the housing;
   wherein one side of the plurality of side walls of the frame facing the adjacent plurality of housing side walls comprises a plurality of first receiving grooves, the plurality of shock-absorbing components comprise a plurality of first shock-absorbing components, the plurality of first shock-absorbing components are received in the plurality of first receiving grooves, and the plurality of first shock-absorbing components are sandwiched between the plurality of side walls of the frame and the plurality of housing side walls of the housing.

2. The voice coil motor assembly according to claim 1, wherein the plurality of side walls of the frame are protruded with a plurality of first convex rings toward a side of the adjacent plurality of housing side walls, the plurality of first convex rings respectively form the plurality of first receiving grooves, a portion of the plurality of first shock-absorbing components is located in the plurality of first receiving grooves, and another portion of the plurality of first shock-absorbing components is located outside the plurality of first receiving grooves and covers the plurality of first convex rings.

3. The voice coil motor assembly according to claim 2, wherein each of the plurality of first convex rings is an oblong ring, and each of the plurality of first receiving grooves is an oblong groove.

4. The voice coil motor assembly according to claim 2, wherein the plurality of first shock-absorbing components are sandwiched in groups of two between each of the side walls and each of the housing side walls.

5. The voice coil motor assembly according to claim 2, wherein the support frame comprises a plurality of second receiving grooves on a side facing the housing top wall, the plurality of shock-absorbing components comprise a plurality of second shock-absorbing components, the plurality of second shock-absorbing components are received in the plurality of second receiving grooves, and the plurality of second shock-absorbing components are sandwiched between the support frame and the housing top wall of the housing.

6. The voice coil motor assembly according to claim 5, wherein a plurality of second convex rings are protruded from a side of the support frame facing the housing top wall, the plurality of second convex rings respectively form the plurality of second receiving grooves, a portion of the plurality of second shock-absorbing components is located in the plurality of second receiving grooves, another portion of the plurality of second shock-absorbing components is located outside the plurality of second receiving grooves and covers the plurality of second convex rings.

7. The voice coil motor assembly according to claim 6, wherein a side of the support frame facing the housing top wall of the housing comprises a plurality of third receiving grooves corresponding to the elastic sheet, a plurality of third shock-absorbing components are received in the plurality of third receiving grooves, and a portion of the elastic sheet is fixed in the plurality of third shock-absorbing components.

8. The voice coil motor assembly according to claim 7, wherein the elastic sheet is suspended above the top surface of the frame via a plurality of suspension wires, the plurality of suspension wires extend upward from the base and are surrounding an outside of the frame, the plurality of suspension wires are fixed to the base by a plurality of fourth shock-absorbing components, and the plurality of fourth shock-absorbing components extend downward to a side edge of the base.

9. The voice coil motor assembly according to claim 1, wherein a material of the plurality of shock-absorbing components is silica gel, rubber, or thermoplastic elastomer.

10. The voice coil motor assembly according to claim 1, wherein the elastic sheet is suspended above the top surface of the frame via a plurality of suspension wires, the plurality of suspension wires extend upward from the base and are surrounding an outside of the frame, the plurality of suspension wires are fixed to the base by a plurality of fourth shock-absorbing components, and the plurality of fourth shock-absorbing components extend downward to a side edge of the base.

11. A voice coil motor assembly, comprising:
    a base; and
    a frame disposed on the base, wherein the frame comprises a bottom surface, a top surface opposite to the bottom surface, a plurality of side walls surrounding the bottom surface and the top surface, and a support frame located between the plurality of side walls;

an elastic sheet, wherein one side of the elastic sheet is disposed on the top surface of the frame and the other side of the elastic sheet is disposed on the support frame;

a housing disposed above the base to receive the frame and the elastic sheet, wherein the housing comprises a housing top wall and a plurality of housing side walls surrounding the housing top wall; and a plurality of shock-absorbing components disposed on the frame, wherein the plurality of shock-absorbing components are sandwiched between the frame and the plurality of housing side walls of the housing and/or between the support frame and the housing top wall of the housing;

wherein the support frame comprises a plurality of second receiving grooves on a side facing the housing top wall, the plurality of shock-absorbing components comprise a plurality of second shock-absorbing components, the plurality of second shock-absorbing components are received in the plurality of second receiving grooves, and the plurality of second shock-absorbing components are sandwiched between the support frame and the housing top wall of the housing.

12. The voice coil motor assembly according to claim 11, wherein a plurality of second convex rings are protruded from a side of the support frame facing the housing top wall, the plurality of second convex rings respectively form the plurality of second receiving grooves, a portion of the plurality of second shock-absorbing components is located in the plurality of second receiving grooves, another portion of the plurality of second shock-absorbing components is located outside the plurality of second receiving grooves and covers the plurality of second convex rings.

13. The voice coil motor assembly according to claim 12, wherein each of the plurality of second convex rings is a circular ring, and each of the plurality of second receiving grooves is a circular groove.

14. The voice coil motor assembly according to claim 11, wherein the elastic sheet is suspended above the top surface of the frame via a plurality of suspension wires, the plurality of suspension wires extend upward from the base and are surrounding an outside of the frame, the plurality of suspension wires are fixed to the base by a plurality of fourth shock-absorbing components, and the plurality of fourth shock-absorbing components extend downward to a side edge of the base.

15. A voice coil motor assembly, comprising:

a base; and a frame disposed on the base, wherein the frame comprises a bottom surface, a top surface opposite to the bottom surface, a plurality of side walls surrounding the bottom surface and the top surface, and a support frame located between the plurality of side walls;

an elastic sheet, wherein one side of the elastic sheet is disposed on the top surface of the frame and the other side of the elastic sheet is disposed on the support frame;

a housing disposed above the base to receive the frame and the elastic sheet, wherein the housing comprises a housing top wall and a plurality of housing side walls surrounding the housing top wall; and a plurality of shock-absorbing components disposed on the frame, wherein the plurality of shock-absorbing components are sandwiched between the frame and the plurality of housing side walls of the housing and/or between the support frame and the housing top wall of the housing;

wherein a side of the support frame facing the housing top wall of the housing comprises a plurality of third receiving grooves corresponding to the elastic sheet, a plurality of third shock-absorbing components are received in the plurality of third receiving grooves, and a portion of the elastic sheet is fixed in the plurality of third shock-absorbing components.

16. The voice coil motor assembly according to claim 15, wherein the elastic sheet is suspended above the top surface of the frame via a plurality of suspension wires, the plurality of suspension wires extend upward from the base and are surrounding an outside of the frame, the plurality of suspension wires are fixed to the base by a plurality of fourth shock-absorbing components, and the plurality of fourth shock-absorbing components extend downward to a side edge of the base.

* * * * *